United States Patent
Schumacher et al.

(10) Patent No.: US 8,355,233 B2
(45) Date of Patent: Jan. 15, 2013

(54) SHORT-CIRCUIT PROTECTION FOR AN ELECTRIC VEHICLE BATTERY

(75) Inventors: Jens Schumacher, Lörrach (DE); Franz-Josef Lietz, Oberhausen-Lirich (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 0 days.

(21) Appl. No.: 13/318,724

(22) PCT Filed: Mar. 26, 2010

(86) PCT No.: PCT/EP2010/053978
§ 371 (c)(1),
(2), (4) Date: Dec. 5, 2011

(87) PCT Pub. No.: WO2010/127911
PCT Pub. Date: Nov. 11, 2010

(65) Prior Publication Data
US 2012/0106017 A1 May 3, 2012

(30) Foreign Application Priority Data
May 8, 2009 (DE) .......................... 10 2009 020 559

(51) Int. Cl.
*H02H 1/00* (2006.01)
(52) U.S. Cl. ...................................... 361/114
(58) Field of Classification Search .............. 361/114
See application file for complete search history.

(56) References Cited

U.S. PATENT DOCUMENTS

| | | | |
|---|---|---|---|
| 6,049,265 A | 4/2000 | Hähnel et al. | 335/220 |
| 2007/0188147 A1 | 8/2007 | Straubel et al. | 320/134 |
| 2008/0013241 A1 | 1/2008 | Wong et al. | 361/114 |
| 2011/0135984 A1* | 6/2011 | Ekchian | 429/97 |

FOREIGN PATENT DOCUMENTS

| | | |
|---|---|---|
| DE | 19701933 | 1/1997 |
| DE | 19749896 | 11/1997 |
| EP | 2117095 | 11/2009 |
| JP | 2004007919 | 8/2004 |
| KR | 20070093753 | 9/2007 |

OTHER PUBLICATIONS

Berdichevsky, Gene et al., "The Tesla Roadster Battery System", Tesla Motors, 5 pages, Aug. 16, 2006.
German Patent Office, In German: Office Action dated Jan. 5, 2010, pertaining to Application No. 10 2009 020 559.4-32, 5 pages.
International Searching Authority, International Search Report—International Application No. PCT/EP2010/053978, dated Jul. 22, 2010, together with the Written Opinion of the International Searching Authority, 12 pages.

* cited by examiner

*Primary Examiner* — Ronald W Leja
(74) *Attorney, Agent, or Firm* — Sunstein Kann Murphy & Timbers LLP

(57) ABSTRACT

Device for electrically protecting an electric vehicle. To protect high voltage batteries of electric vehicles in the event of floods, a disconnecting device 6 for electrically disconnecting a vehicle battery 2 from an electric distribution system 8 within the vehicle and a detection device 4 for determining wetness are provided such that the detection device 4 activates the disconnecting device 6 if wetness 12 is detected, so that the vehicle battery 2 is electrically disconnected from the electric distribution system 8.

8 Claims, 2 Drawing Sheets

SHORT-CIRCUIT PROTECTION FOR AN ELECTRIC VEHICLE BATTERY

The subject matter relates to a device for electrically protecting an electric vehicle as well as to an electric vehicle with such a device, and also a method for electrically protecting an electric vehicle.

The use of electric engines will become more and more significant in future in automotive engineering. At present, various concepts exist for hybrid vehicles as well as purely electric vehicles. In particular, in the case of purely electric vehicles, the total amount of energy required for the drive system must be stored in batteries. These batteries are regularly high voltage batteries, providing several 100V. Maximum currents of more than 100 A are possible in these batteries.

Safety aspects are coming more into focus because of the constantly increasing prevalence of electric engines and therefore high voltage batteries. The terminal voltage is frequently so high in the use of batteries for electric vehicles that an electric insulation between the battery poles has to have high dielectric strength. If vehicles of this type come upon bad weather conditions, however, or if the maximum fording depth is reached, the poles of the battery may come into contact with water. This water can lead to short circuits between the poles or within the battery. Because of the high energies which the batteries can provide for electric vehicles, short circuits frequently lead to harm to people or to fires.

For this reason it is necessary to ensure that batteries for electric vehicles are protected against wetness. The subject matter was therefore based on the object of providing a device for electrically protecting an electric vehicle, which particularly simply prevents damage to the vehicle and people from electric short circuits.

This object is achieved by a device according to claim 1.

It has been recognised that wetness in the region of the vehicle battery can lead to short circuits. In order to reliably prevent these short circuits, it is proposed according to one embodiment to disconnect the vehicle battery from the electric distribution system when wetness is detected. In this case, the electric line may be a connection of the battery to the electric distribution system within the vehicle.

In particular when liquid directly arrives at the poles of the vehicle battery, the latter have to be disconnected from the electric distribution system. Otherwise, a short circuit can be produced by the water. This short circuit may lead to damage to people because of the high voltages in the vehicles. Fires may also occur owing to short circuits of this type.

In areas in which heavy rain falls are to be expected, the water arriving in the region of the battery of the vehicle due to the rain can lead to short circuits of this type. The battery of the vehicle may, for example, be arranged in the engine compartment or in other available spaces of the vehicle, for example in the region of the boot or the underbody. With the device according to the subject matter, the penetration of water into the region of the battery or into the battery can be detected and the electric line of the battery can be disconnected.

In particular in the case of off-road vehicles, it is to be assumed that when they reach the maximum fording depth, the vehicle battery comes into contact with water. A reliable disconnection of the battery from the electric distribution system also has to be ensured here for safety reasons.

The electric line may be a connection of battery cells within the battery. In particular in the case of high-voltage batteries, a battery can be interconnected from a plurality of cells. The individual cells have low electric potentials. By means of a series connection of a plurality of cells, a large electric voltage can be produced, however. In order to prevent this, the connection between the cells can be disconnected in the case of wetness being detected in the vehicle battery. The electric potential of cells connected in series being applied to the connection poles of the battery is thus prevented.

It is also to be assumed in flood regions that vehicles will be entrained by rivers breaking their banks. In the region of these vehicles, there is a danger to approaching people due to the electric contact between the battery and the water. In order to minimise this danger, the disconnecting device has to disconnect the line of the battery, so the electric potential in the battery is disconnected from the wetness.

According to an embodiment it is proposed that the vehicle battery is a high voltage battery. A high voltage battery is regularly a battery providing voltages of above 100 V. Such high voltage batteries are used, in particular in electric vehicles. Penetrating wetness is an enormous safety risk specifically when using high voltage batteries. In order to ensure that high voltage batteries are not short-circuited by water entering, the disconnecting device is objectively activated.

According to an embodiment it is proposed that the detection device is arranged on the vehicle battery. In particular wetness in the region of the vehicle battery can lead to short circuits. For this reason, the detection device is arranged on the vehicle battery. It is therefore ensured that as soon as wetness arrives in the vehicle battery, in particular as soon as the vehicle battery is surrounded by liquid, the poles of the battery are disconnected from the distribution system.

It is also proposed that the detection device is arranged in the vehicle battery. Therefore, penetrating water can be detected. In particular in the case of so-called battery packs, penetrating wetness is a problem to be taken seriously. For example, the objective vehicle battery according to the subject matter may be a lithium-ion battery, which is interconnected from a large number of similar cells.

The interconnection of many cells of a battery makes it possible to provide the power required for a vehicle battery. Other cells, which are per se low voltage batteries, may be interconnected. Battery packs interconnected in this way have to be reliably protected from short circuits within the battery pack, as otherwise these short circuits can lead to a destruction of the battery pack. For this reason, the detection device is arranged in the vehicle battery in order to detect wetness in the vehicle battery. The connection between the cells of the battery pack can therefore be disconnected when wetness penetrates.

In order to be able to detect, in particular, rising wetness, for example rising water, early, it is proposed that the detection device be arranged below the battery contacts or below the battery base. This detection device therefore already leads to an activation of the disconnecting device before the wetness has reached the region of the battery contacts or the cells of the battery. In particular in the case of rising rivers or when off road vehicles drive through rivers, an arrangement of this type is advantageous as the battery is disconnected from the distribution system or the cells of the battery are disconnected from one another as soon as the liquid approaches from below.

The electric potential of the battery is frequently distributed in the vehicle by means of heavy current lines. Lines of this type may also run in the underbody of the vehicle or within the vehicle and be located below the level of the battery contacts. Lines of this type also have to be protected from short circuits due to wetness occurring, in particular in the region of electrical taps, which are not insulated. For this reason, it is proposed that the detection device is arranged in the region of the lowest point of the electric distribution system carrying the voltage of the vehicle battery. The main distribution system of the vehicle battery carries the voltage of the vehicle battery. Sub-distribution systems, which can be operated with lower voltages, branch off from this. However, in particular the electric connection between the vehicle battery and the electric motor carries the voltage of the vehicle battery. In particularly an electric connection of this type has to be reliably protected from a short circuit. For this reason, the detection device is arranged at the lowest point at least of this connection between the battery and engine. Rising water can therefore be detected early and the battery contacts disconnected from the distribution system.

Reliable detection of wetness is helpful in particularly at branches of the distribution system which are only partially insulated in order to disconnect the line from the battery in the case of rising liquid in the region of the branch which is not insulated or only partially insulated.

According to an embodiment it is proposed that the detection device has a wetness sensor. The wetness sensor detects wetness in different concentrations. For example, it is possible for the wetness sensor to be adjusted in such a way that it only works as soon as it is substantially completely surrounded by liquid. The wetness sensor can be designed here in such a way that water drops and also raindrops are not sufficient to activate the wetness sensor. Rather, the wetness sensor can be formed in such a way that it is only activated when it is completely surrounded by wetness. For example, the wetness sensor may have a surface of one or more square centimetres. Only when the entire surface comes into contact with wetness can the wetness sensor be activated.

According to an embodiment it is proposed that the wetness sensor is a water sensor. This may be formed in such a way, for example, that it is only activated when it is surrounded by water.

It is also proposed that the detection device has at least one rain sensor. The rain sensor may be designed in such a way that the detection device is activated during heavy rain. As a result, it is prevented that electric short circuits can be caused at the vehicle battery during heavy rain.

According to an embodiment it is proposed that the disconnecting device mechanically disconnects the line of the battery. In particular, it is possible for the disconnecting device to disconnect the battery contacts from the electric distribution system without destruction. A disconnection of this type may be cancelled again, for example. In this case it is possible, for example, for the disconnecting device to bring about a first stage of the disconnection by means of a destruction-free mechanical disconnection means. A disconnection of this type may, for example, be activated in the event of detected heavy rain. If the rain eases off, the electric contact may, for example, be automatically closed again.

According to an advantageous embodiment it is proposed that the line be disconnected pyrotechnically. The disconnecting device can be designed in such a way that the disconnection is irrevocable. Destruction of the electric connection can be brought about during the disconnection. An irrevocable disconnection of this type, which can only be cancelled by exchanging the disconnection means, may be advantageous, in particular, when the vehicle to be protected is completely washed round by water. It is also possible for the pyrotechnic disconnection to be used in combination with the mechanical disconnection mentioned above. Thus, in the event of heavy rain, a mechanical separation can firstly take place, which can be restored. Only when a specific fording depth has been exceeded or the vehicle is completely washed round by water, can the pyrotechnic disconnection be used.

A further subject matter is an electric vehicle with a device according to claim 1.

According to a further subject, a method for electrically protecting an electric vehicle is proposed with the steps of determining wetness within the electric vehicle, and electric disconnection of a line of the vehicle battery when wetness is detected.

The subject matter will be described in more detail below with the aid of drawings showing embodiments, in which:

DETAILED DESCRIPTION OF THE DRAWINGS

Figure 1:
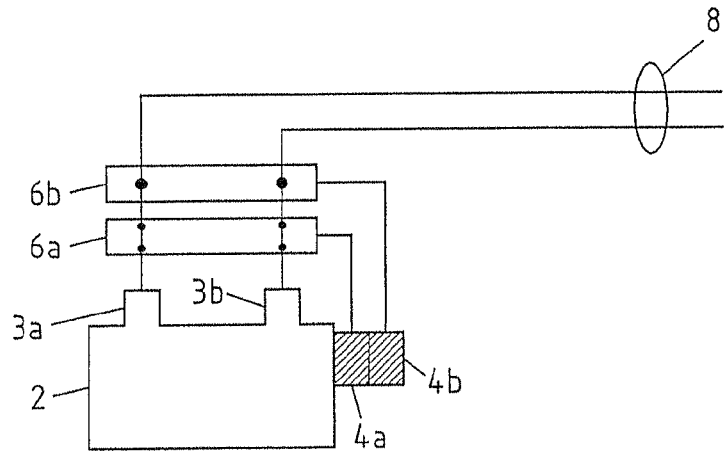
FIG. 1 shows a schematic view of a protection device in the inactive state.

FIG. 1 shows a high voltage battery 2 with battery connection poles 3a, 3b. The connection poles 3a and 3b have different polarities. Electrically connected to the connection poles 3 is an electric distribution system 8 formed from at least two cables, which connect the battery 2 to an electric motor, not shown, of The motor vehicle. Provided between the electric motor and the battery poles 3 is a disconnecting device 6, which is formed from two disconnecting devices 6a, 6b. The disconnecting device 6a is a mechanical disconnecting device, which can bring about a destruction-free disconnection of the battery poles 3 from the electric distribution system 8. The disconnecting device 6b is a pyrotechnic disconnecting device, which can disconnect the battery poles 3 from the electric distribution system 8 by destruction of the current path. A detection device 4 formed from a rain sensor 4a and a water sensor 4b is furthermore shown in FIG. 1.

The disconnecting device 6 can be activated by means of the detection device 4 in such a way that the disconnecting device 6 disconnects the battery poles 3 from the electric distribution system 8 upon activation.

Figure 2:
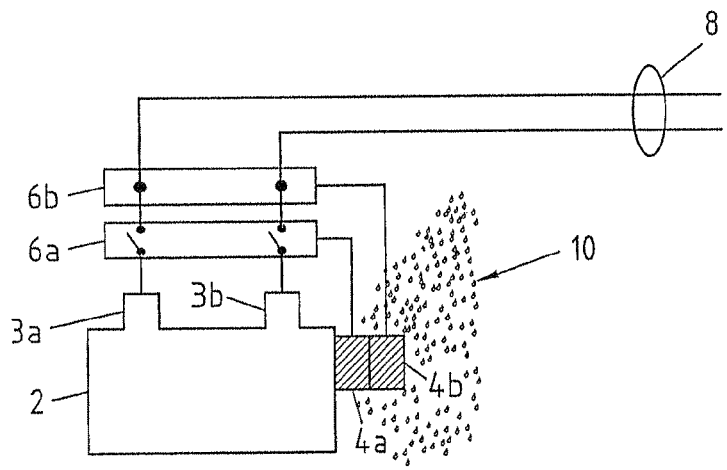
FIG. 2 shows a schematic view of a protection device in the activated state.

FIG. 2 schematically shows an activation of the mechanical disconnecting device 6a. FIG. 2 schematically shows a large number of raindrops 10. The raindrops 10 can be detected by means of the rain sensor 4a. If the rain sensor 4a detects the raindrops 10, the rain sensor 4a passes an activation signal to the mechanical disconnecting device 6a. In the mechanical disconnecting device 6a, a switch is opened in a destruction-free manner in such a way that at least one of the battery poles 3 is electrically disconnected from the electric distribution system 8. The two battery poles 3 are preferably electrically disconnected from the electric distribution system 8.

If the rain sensor 4a detects that no further rain 10 is present, an activation signal can again be transmitted to the mechanical disconnecting device 6a and the switch can be closed. As a result, it is possible, in the event of heavy rain, which stops after a certain time, for the electric distribution system 8 to be disconnected from the battery poles 3, but the disconnection can be reversed again. The rain sensor 4a and the mechanical disconnecting device 6a are optional.

Figure 3:
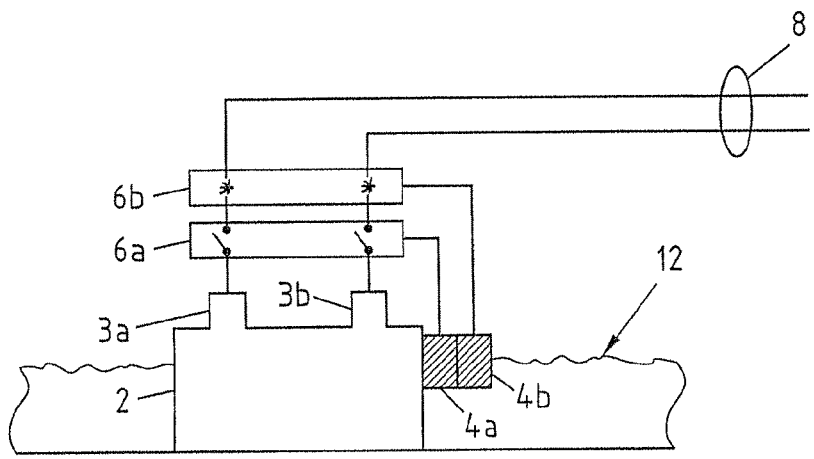
FIG. 3 shows a schematic view of a protection device, also in the activated state.

A reliable disconnection of the electric distribution system 8 from the battery poles 3 at least has to be ensured when the battery 2 is surrounded by water. FIG. 3 schematically shows a configuration of a case such as this. FIG. 3 shows that the battery 2 is surrounded by water 12. The water 12 means that both the rain sensor 4a and the water sensor 4b are activated and transmit corresponding activation signals to the mechanical disconnecting device 6a and the pyrotechnic disconnecting device 6b.

The mechanical disconnecting device 6a is activated by means of the rain sensor 4a, as already described in conjunction with FIG. 2. The water 12 can be detected by means of the water sensor 4b and an activation signal is transmitted to the pyrotechnic disconnecting device 6b. By means of the activation signal, a pyrotechnic disconnection means in the disconnecting device 6b is activated in such a way that the connection between the battery pole 3 and electric distribution system 8 is electrically disconnected. The current path is thus destroyed. It is only possible to restore the current path by exchanging the pyrotechnic disconnecting device 6b. This ensures that in the event of flooding of the vehicle, a reliable disconnection of the electric distribution 8 from the battery pole 2 takes place, which cannot readily be restored.

Figure 4:
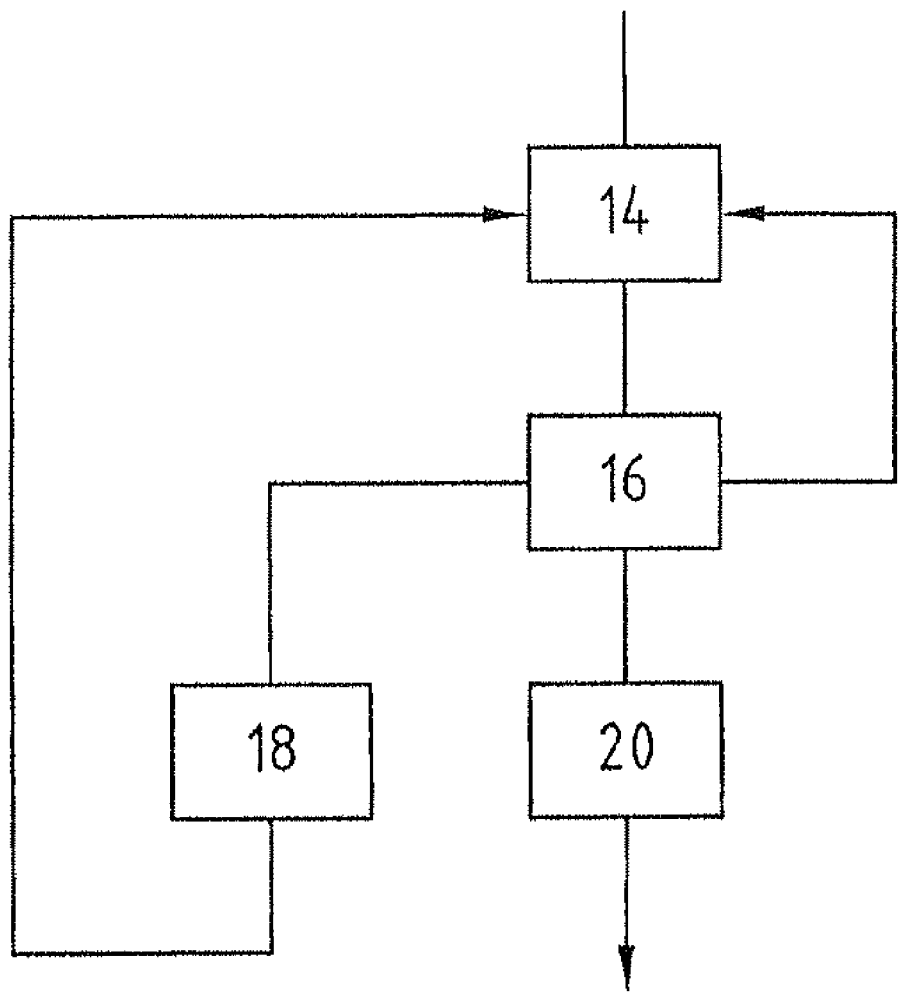
FIG. 4 shows a flow chart of an objective method, according to an advantageous embodiment.

FIG. 4 schematically shows a course of an objective method.

The rain sensor 4a and the water sensor 4b are activated in a first step 14.

In a second step 16, the status of the rain sensor 4a and the water sensor 4b are queried. If neither of the sensors 4a, 4b reports an activation by rain or water, the method returns to step 14.

If, in step 16, an occurrence of raindrops 10 is detected by the rain sensor 4a, a branching can be carried out in step 18. In step 18, the mechanical disconnecting device 6a is activated by means of the rain sensor 4a in such a way that the connection between the battery pole 3 and electric distribution system 8 is triggered without destruction. A return is thereupon made to step 14.

If the water sensor 4b detects in step 16 that water 12 is surrounding the battery 2, a branch is taken in step 20. In step 20, at least the pyrotechnic disconnecting device 6b is activated by means of the water sensor 4b in such a way that the pyrotechnic disconnection means is ignited and the electric connection between the battery pole and the electric distribution system 8 is disconnected. This connection cannot be restored.

An increased protection of electric vehicles is provided by means of the method and the device of the subject matter. High voltage batteries can be reliably disconnected from the electric distribution system, so that damage to people and vehicles from electric short circuits is reliably avoided.

The invention claimed is:

1. Device for electrically protecting an electric vehicle comprising:
    a disconnecting unit for electrically disconnecting electric lines of a vehicle battery, and
    a detection unit for determining moisture, in such a way that the detection unit activates the disconnecting unit when moisture is detected, so the electric line is electrically disconnected,
    wherein the electric line is a connection of battery cells within the battery, and that the detection unit is arranged on the vehicle battery, and that the detection unit activates the disconnecting unit to disconnect the connection between the battery cells, when water arrives within the battery.

2. Device according to claim 1, wherein the vehicle battery is a high voltage battery.

3. Device according to claim 1, wherein the detection unit has at least one moisture sensor.

4. Device according to claim 3, wherein the moisture sensor is a water sensor.

5. Device according to claim 1, wherein the detection unit has at least one rain sensor.

6. Device according to claim 5, wherein the disconnecting unit when activated by the rain sensor disconnects the battery contacts mechanically from the electric distribution system when rain is detected, and that the disconnecting unit, when activated by the water sensor disconnects the battery contacts pyrotechnically from the electric distribution system when surrounded by water.

7. Electric vehicle comprising a device according to claim 1.

8. Method for electrically protecting an electric vehicle comprising: determining moisture within the electric vehicle, and electrically disconnecting a line of a battery of the vehicle when moisture is detected,
    wherein a detection unit is arranged within the vehicle battery, and that a disconnecting unit is activated by the detection unit to disconnect the connection between cells of the battery when water arrives within the battery.

* * * * *